United States Patent
Kelwaski

(12) 
(10) Patent No.: US 6,272,402 B1
(45) Date of Patent: Aug. 7, 2001

(54) REMOTE INTERFACE MODULES WITH PROGRAMMABLE FUNCTIONS

(75) Inventor: H. Edward Kelwaski, Craigville, IN (US)

(73) Assignee: Navistar International Transportation Corp., CUciago, IL (US)

( * ) Notice: Subject to any disclaimer, the term of this patent is extended or adjusted under 35 U.S.C. 154(b) by 0 days.

(21) Appl. No.: 09/354,452

(22) Filed: Jul. 15, 1999

(51) Int. Cl.$^7$ .............................. G06F 17/00; G06F 7/00
(52) U.S. Cl. .................................. 701/1; 701/29; 701/36; 307/9.1
(58) Field of Search ................................... 701/1, 29, 33, 701/35, 36; 307/10.1, 9.1; 709/202, 223

(56) References Cited

U.S. PATENT DOCUMENTS

| | | |
|---|---|---|
| 4,258,421 | 3/1981 | Juhasz . |
| 4,809,177 | 2/1989 | Windle et al. . |
| 5,483,230 | 1/1996 | Mueller . |
| 5,510,775 | 4/1996 | Loncle . |
| 6,049,269 * | 4/2000 | Byrd et al. ............................ 340/426 |
| 6,076,099 * | 6/2000 | Chen et al. .......................... 709/202 |
| 6,094,609 * | 7/2000 | Arjomand .............................. 701/29 |

FOREIGN PATENT DOCUMENTS 0811528    12/1997   (EP) .

* cited by examiner

Primary Examiner—William A. Cuchlinski, Jr.
Assistant Examiner—Gertrude Arthur
(74) Attorney, Agent, or Firm—Jeffrey P. Calfa; Dennis Kelly Sullivan Gilberto Hernandez; Neil T. Powell

(57) ABSTRACT

A control system for vehicle accessories differentiated from one another in terms of required voltage, current drawn, load duration and variability of energization levels utilizes generic interface modules to effect control. One or more generic remote interface modules, in addition to controllers such as engine and chassis controllers, are mounted on the vehicle for controlling actuation and energization of the non-standard devices, such as motors driving pumps for hydraulic lits. An electronic system controller (ESC) manages the remote interface modules over a serial communication link to provide the specialized functionality. Each remote interface module (RIM) is constructed as a standard component capable of providing digital and analog outputs to devices attached to one or more output ports on the module. The remote interface assumes a number of controller states under the control of the electronic system controller for regulating actuation and energization of the differentiated loads. Input ports are also provided for digital and analog inputs from sensors, which signals may be formatted for transmission to the electronic system controller. The electronic system controller includes memory for storing a data structure specifying permissible remote interface module states and a map to the module's ports to provide for the actuation and energization of the differentiated loads.

13 Claims, 4 Drawing Sheets

REMOTE INTERFACE MODULES WITH PROGRAMMABLE FUNCTIONS

BACKGROUND OF THE INVENTION

1. Field of the Invention:

The present invention relates to a system for multiplexed communications on vehicles and particularly relates to providing non-specialized remote interface modules from which may be invoked specialized functionality by an electronic system controller. The remote interface modules operate specific vehicle systems under the direction of an electronic system controller communicating with the remote interface module over a multiplexed communication system. The electronic system controller is programmable to implement, in sequence, certain states on the remote interface module(s). The present invention further relates to a method for installing the programming on electronic system controllers.

2. Description of the Prior Art:

Multiplexed communications involve data transmission interconnections which interleave nonsynchronous digital signals into a single serial signal. Multiplexed communication systems also provide the reverse function (demultiplexing) of dividing the single signal into multiple, nonsynchronous digital signals. Applied to motor vehicles, multiplexed serial communication paths are seen as an effective technique for reducing the number of dedicated communication paths between the numerous switches, sensors, device and gauges installed on the vehicles. With each increase in the number and variety of accessories and functions installed on each vehicle, the benefits of using a single, multiplexed serial communication link for passing instructions to and receiving information from vehicle devices as diverse as running lights and rear axle temperature sensors becomes greater. Multiplexing the signals to and from vehicle systems promises greater physical simplicity through displacing much of the vehicle wiring harness, the reduction of manufacturing costs, the enabling of vehicle electrical load management, and the enhancement of system reliability. The development by the Society of Automotive Engineers of the J1939 series of standards for multiplexed communications testifies to the progress in the application of multiplexed communications to vehicles. Standards have been or are being developed relating the communication path, transmission collision detection, diagnostic ports and data protocols, among other topics.

A multiplexed serial communications system can link several remote digital controllers positioned around a vehicle with an electrical system controller (ESC) for two way communication. Remote digital controllers are addressable, allowing them to respond to signals intended for them initialize particular functions. They may also include programming that allows the device to react to local conditions as well as condition indicating signals provided the controller. The ESC may pass requests and instructions received for operations of certain devices, addressed to the correct remote controller, in a fashion to condition the timing and duration of the responses to requests to better manage overall vehicle electrical load.

U.S. Pat. No. 4,809,177 to Windle, et al., which is assigned to the assignee of this patent, relates to a multiplexed communications system in which a central controller organizes signals to various vocational controllers distributed about a vehicle. The distributed controllers included internal data processing capability and programming. Among the controllers were engine, cab and chassis controllers. The environment of Windle et al. is a limited multiplexing environment, where much operational responsibility is distributed to the controllers.

Windle et al. teach a controller constructed according to a single design suitable for use both as a chassis controller and a cab controller. The chassis controller handles the engine brakes, the ignition, the air conditioning compressor and some external lights while the cab controller handled other external lights, the air conditioning compressor, the windshield wiper motor, among other functions. The dual purpose controller is a microprocessor based system running stored programs in local memory. The controller is adapted to handle one or the other of the differing sets of functions by being reprogrammed and by applying different inputs to the device. Reprogramming involved overwriting non-volatile memory or replacing programmable read only memory units. Windle et al. recognized that if a controller could be constructed in accordance with a single design for different vocations, benefits would be gained in terms of inventory costs and manufacturing costs, and anticipated improvements in reliability. However, Windle et al. did not attempt to extend the idea of single design controller outside of an environment where the requirements on the controller could be fully anticipated nor did they attempt to remove specialized programming from the distributed controllers.

The extension of the idea of applying a generic controller to differing vocations is greatly complicated where the chassis manufacturer may not know the functions to which a controller will be put. Remote controllers are more readily applied to vehicles where the accessories to be installed on the vehicle are fairly standardized, even if numerous, than they are to commercial vehicles where the vehicle's required vocations are less predictable. This is especially true where a manufacturer provides a chassis and the purchaser adds extensive functionality. A number of examples of this situation come readily to mind, for example, coach builders of luxury busses, fire trucks and ambulances all place highly specialized requirements on a vehicle's electrical system which may, or may not, be known to the chassis manufacturer. In some cases these requirements may even be unique to a particular vehicle. Still, it is desirable for a coach builder to be able to adapt a serial communication system for the functionality of its bodies and to be able to specify accessory functionality without the need to hardwire that functionality into the vehicle.

Substantial economies of scale could be gained from using a standardized component for several vocations on commercial vehicles. The ability to support such a device would also simplify assembly and allow for smaller parts inventories, as partially achieved by Windle et al. Were remote controllers truly multi-application ready, greater differentiation in vehicles would also be obtainable.

SUMMARY OF THE INVENTION

According to the invention there is provided a vehicle having a plurality of electrical loads, differentiated from one another in terms of required voltage, current drawn, load duration and variability of energization levels. One or more generic remote interface modules, in addition to controllers such as engine and chassis controllers, are mounted on the vehicle for controlling actuation and energization of the non-standard devices, such as motors driving pumps for hydraulic lifts. An electronic system controller (ESC) manages the remote interface modules over a serial communication link to provide the specialized functionality. Each remote interface module (RIM) is constructed as a standard component capable of providing digital and analog outputs to devices attached to one or more output ports on the module. The remote interface assumes a number of controller states under the control of the electronic system controller for regulating actuation and energization of the differentiated loads. Input ports are also provided for digital and analog inputs from sensors, which signals may be formatted for transmission to the electronic system controller. The electronic system controller includes memory for storing a data structure specifying permissible remote interface module states and a map to the module's ports to provide for the actuation and energization of the differentiated loads.

The communication system is accessible over a diagnostic port which may be externally accessed to write a database which specifies RIM functionality to ESC memory. During manufacture, vehicle specific databases for remote interface modules are tagged to chassis vehicle identification numbers (VINs). During chassis assembly, the diagnostic port is accessed and the VINs are retrieved from the ESC by an off-vehicle manufacturing support computer to which the database for the vehicle's remote interface module has been previously stored. The database is then downloaded to the vehicle to provide specialized response characteristics for the remote interface module.

Additional effects, features and advantages will be apparent in the written description that follows.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Figure 1:
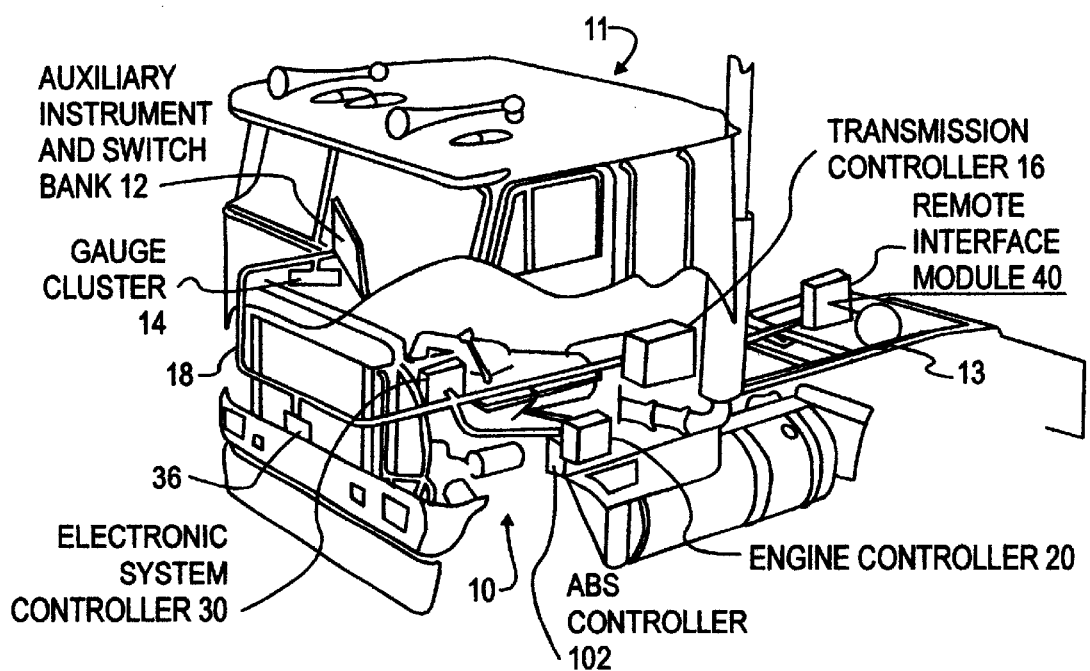
FIG. 1 is a perspective view of a vehicle electrical system.

FIG. 1 is a perspective view of a vehicle electrical system 10 installed on a vehicle 13. Vehicle electrical system 10 comprises an electronic system controller (ESC) 30, which is the primary component of a vehicle electronic control system. ESC 30 manages a number of vocational controllers disposed on vehicle 13 and executes a load management program which oversees the total load imposed on the vehicle electrical system and power train by various accessories installed on the vehicle. Most active vehicle components are directly controlled by the vocational controllers, which include a gauge cluster 14, an engine controller 20, a transmission controller 16, an auxiliary instrument and switch bank 12, an antilock brake system (ABS) controller 102, and one or more remote interface modules 40. All vehicle electrical components are attached to a harness 18, which includes a serial data link, power and ground conductors. The serial data link is a twisted pair cable constructed in accordance with SAE standard J1939 and is externally accessible via a diagnostic port 36.

Gauge cluster 14, transmission controller 16, ABS controller 102 and engine controller 20 may be implemented to exercise substantial local control, incorporating their own local microprocessors and programming and coupled by input and output ports to sensors and controllable elements in the areas under their respective control. For example, engine controller 20 may monitor an exhaust gas sensor (not shown) on one input channel for indications of unburned fuel in the exhaust and modify control signal(s) effecting the fuel/air mixture. The signals controlled may move a control valve or change the operation of a fuel pump and their determination may take into account the demands for engine power. Similarly, ABS controller 102 can engage brakes per an externally applied command, but modify the actuation signal to the brakes upon sensing skidding.

The loads imposed on vehicle 13 systems controlled by the electronic control system of the present invention are usually electrical loads, however, a remote interface module 40 (or a controller such as transmission controller 16) may electronically control the engagement of mechanical devices to the power train of vehicle 13. Gear selection in an automatic transmission would be just one example. Other nonelectrical loads could include the control of a clutch for an air conditioning compressor and actuation of pumps driven by the vehicle drive train.

Gauge cluster 14, transmission controller 16 and engine controller 20 all communicate with electronic system controller 30, which also monitors inputs received from the auxiliary instrument and switch bank 12, over the serial communication link in harness 18. Electronic system controller 30 may be programmed to override the normal response characteristics of the gauge cluster 14, transmission controller 16 and engine controller 20, should electrical and mechanical loads exceed the capacity of the vehicle, should requests conflict with one another, and under other circumstances.

A remote interface module 40 also communicates with ESC 30. Remote interface module 40 is a general purpose control interface allowing the attachment of various accessories to vehicle 13. As described below, remote interface module 40 provides a plurality of ports providing for each of the following: analog inputs; analog outputs; digital inputs; and digital outputs. Characterization of a particular port as, for example, an output port, does not necessarily mean that it functions exclusively as an output port. For example, an output port may include voltage drop sensing elements, current flow sensing elements, or both, allowing determination by ESC 30 of whether, for example, a bulb in a lamp connected to the output port is operative, or whether a short circuit condition exists in an attached device.

Figure 2:
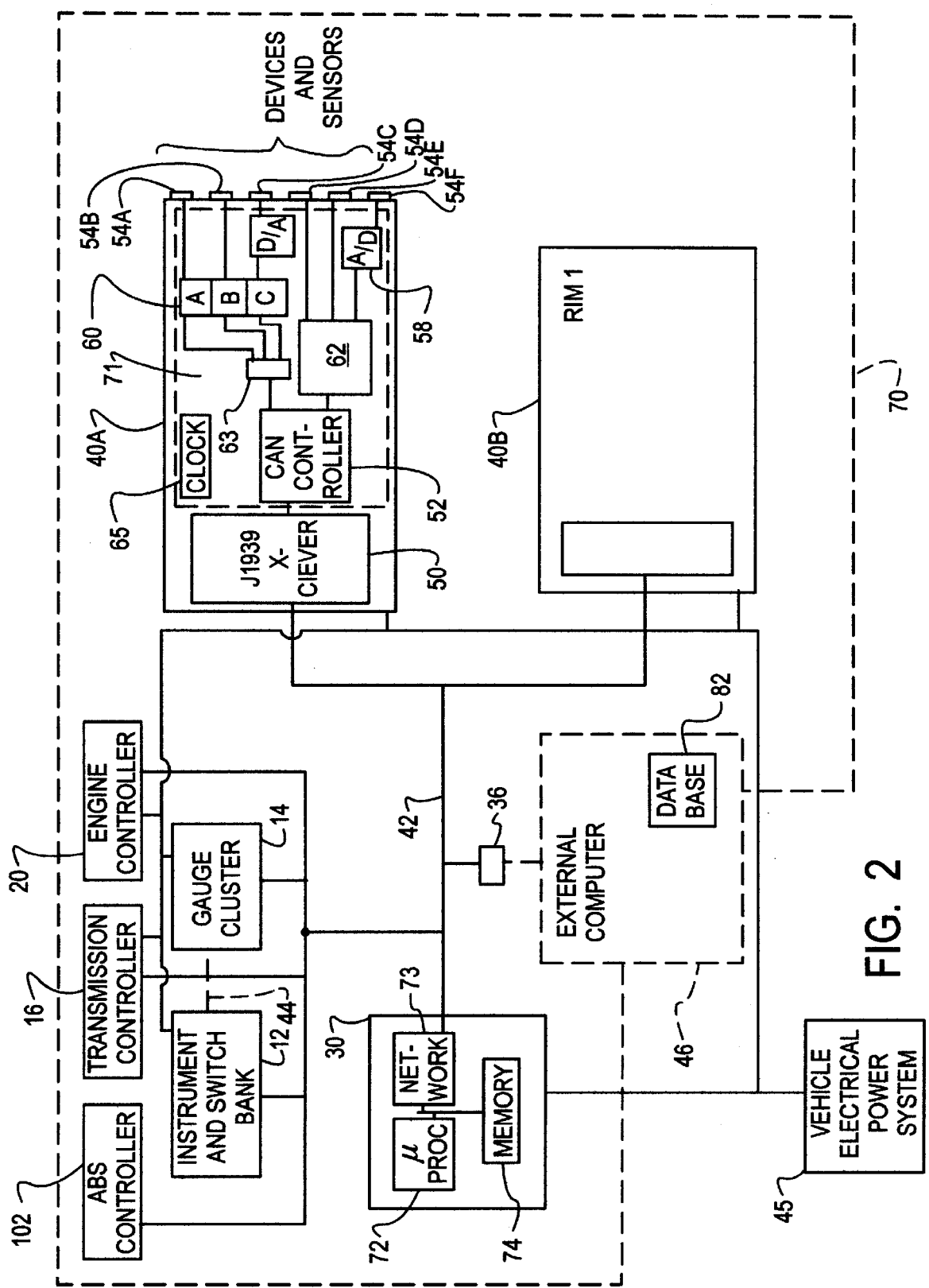
FIG. 2 is a schematic of the vehicle electrical control system contained within the vehicle electrical system of FIG. 1.

FIG. 2 is a schematic illustration of an electronic control system 70 implemented within vehicle electrical system 10. Electronic control system 70 includes a microprocessor 72 based electronic system controller (ESC) 30. ESC 30 coordinates multiplexed transmissions of signals on serial communication link 42 and executes a load management program as part of a process a comprehensive control of one or more remote interface modules (RIMs) 40A and B. ESC 30 comprises a microprocessor 72 executing programs stored in memory 74. Memory 74 is constructed in conventional manner and includes volatile and non-volatile sections, the latter of which is preferably fabricated from flash technology electrically erasable programmable read only memory (EEPROM). A network interface 73 implements J1939 communications over serial communication link 42.

Serial communication link 42 interconnects the auxiliary instrument and switch bank 12, the gauge cluster 14, the transmission controller 16, engine controller 20, ABS controller 102, and RIMs 40A and 40B. Additionally, instrument and switch bank 12 may be connected to cab controller 16 by a private data link 44. All system components are powered by a vehicle electrical power system 45.

While the gauge cluster 14, transmission controller 16 and engine controller 20 have well defined tasks, RIMs 40A and 40B have no predetermined vocation and have no distinguishing attribute vis-a-vis one another other than their respective addresses and possibly the number of ports supported. RIMs 40A and 40B may nonetheless be applied to the control of various highly differentiated accessories.

RIM 40A may be taken as representative of both RIMs. While represented by discreet functional boxes, much of RIM 40A except the J1939 transceiver 50 is conventionally realized using a microcontroller 71. Microcontroller 71 can, under the direction of appropriate inputs mimic various circuit and logic elements, such as oscillators, buffers, analog to digital converters, feed back loops, et cetera. RIM 40A always includes a J1939 transceiver element 50 and a controller area network module 52 which handle communications tasks defined by the J1939 standard over serial communication link 42. RIM 40A typically controls, and in some cases drives, both analog and digital devices. RIM 40A also accepts inputs from both digital and analog devices, primarily switches and sensors. A plurality of ports 54A through 54F are provided allowing connection to several digital and electrical devices. While six ports are shown, RIM 40A allows some salability and the number of ports may be greater or fewer than six.

To explain the operation of RIM 40A a set of functional elements are illustrated, though it will be understood by those skilled in the art that the depicted elements are representative only. All functional elements are invoked by ESC 30 through signals communicated to RIM 40A over serial communication link 42. The attachment of analog devices (not shown) is accommodated by interposing digital to analog (D/A) converters 56 and analog to digital (A/D) converters 58 between a microprocessor 60 and ports 56A–F. D/A converter 56 allows digital outputs from the microcontroller to be scaled to an analog signal level. A/D converter 58 will typically accept an analog signal from a sensor. Some analog devices may be driven from applying pulse width modulation to a digital output port.

Output control circuitry 60, and thereby RIM 40A, can assume any of several states and sequences of states in response to signals received from ESC 30 in order to apply the appropriate output signals on ports 56A–C. Output circuitry 60 may functionally comprise buffers and gating circuitry allowing: scaled signals to be applied to the D/A converters 56; and pulse width modulated or digital signals to be supplied directly to output ports 54A and 54B. An oscillator may be mimicked by repeated alternation of a series of states on an output port. Particular arrangements of buffers, gating circuitry and the like is organized by channels A, B and C, each of which may be individually addressed by ESC 30 through channel address recognition circuitry 63.

Inputs may be received on one or more of input ports 54D to 54F and from there transferred to input serializing circuitry 62. Inputs, such as voltage drop or current drawn, may also be taken from any one of output ports 54A–54C. Input signals may be associated with a particular input channels by serializing the signals using the clock input from clock 65, which is used to control sampling of the signals received from ports 54D and 54E and to control sampling by AID converter 58.

ESC 30 determines output states for RIM 40A based, among other things, on the values for signals received on input ports 54D to 54F, inputs from the instrument and switch bank 12, previous states of the RIM, and load management considerations, which in turn may be influenced by inputs received the engine controller 20, the chassis controller 16 and cab controller 14. ESC 30 is essentially a computer based on a microprocessor 72 executing stored programs on data stored in memory 74 and communicating with the previously described controllers and remote interface modules through a network adaptor 73 using the J1939 standard and permissible extensions thereto. The data structures defining the functionality of RIMs 40A and 40B are written to memory 74 during vehicle assembly via diagnostic port 36 from an external assembly computer 46 using a database 82. The particular data structure written will be developed for the vehicle from its engineering specifications.

Data is communicated in both directions between ESC 30 and RIMs 40A and 40B using the J1939 protocol, which provides in turn for certain proprietary protocols and extensions within the standard. To implement the present invention it necessary to extend the protocol to allow the identification of ports within RIMs.

Figure 3:
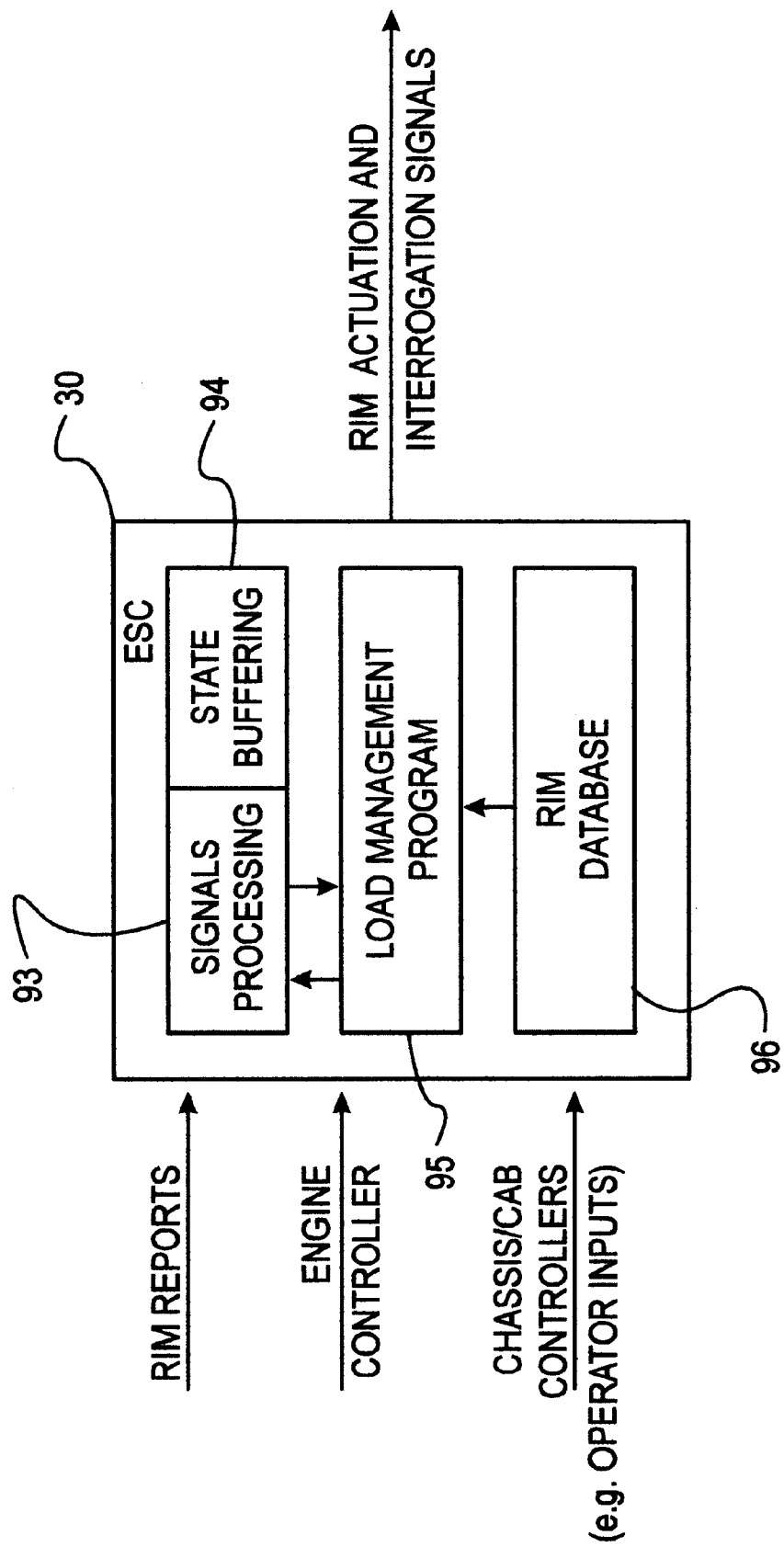
FIG. 3 is a functional illustration of an electrical system controller.

FIG. 3 illustrates the operation of ESC 30. Among the central functions of ESC 30 are the execution of a load management program 95 and execution of a signals processing program 93 which handles management of data traffic on the serial communication link in accordance with the SAE J1939 protocols and permissible extensions thereto. Load management program 95 is a real time interpreter running in an endless loop that scans a set of values or states stored in state buffering section 94 of the signals processing program 93. A possible timing cycle of the loop is 10 milliseconds. All ESC 30 actions are conditioned upon the receipt and periodic update of signals received, such as operator inputs, received primarily from the chassis controller 16 and the cab controller 14, engine controller 20 signals and signals from the RIM(s), which may streamed to allow association with the inputs with particular ports, or may be received in response to an interrogation, in which case addressing information may be returned with the response.

All input and output signals are coordinated by a signals processing program 93, which can poll RIMs, assign port values to RIM signals, in reference database 96 and which also stores values obtained in a state buffering table 94 for the use of the load management program 95.

RIM database 96 characterizes the output for each output port of all RIMs for selected circumstances. For example, a RIM may be installed on a vehicle intended for use as a fire fighting pumper. The pump may be driven by an electric motor powered by the vehicle or it may be driven from a clutch allowing connection to the vehicle drive shaft. The conditions or circumstances controlling actuation of a pump coupled to a RIM may de developed as follows: (1) has pump operation been requested (on/off operator input on a digital RIM input port, determined by periodic request for input port status); (2) is the pump currently on or off; (3) vehicle battery voltage; and (4) what are pump R.P.M.'s or the current drawn by the pump's prime mover. In this example, vehicle battery voltage is monitored to determine if the vehicle is producing enough power to support all of the demands being made on it. A drop in battery voltage below a minimum threshold may entail a response. Pump R.P.M.'s may be monitored to make sure that the pump is loaded, i.e. that it is connected to a water source and/or not cavitating. Where the pump is driven by an electric motor a similar determination may be indicated by looking at the voltage drop across its power inputs (which may in the RIM, or a across a switch operated by the RIM). A small voltage drop may indicate that the pump is not moving any water. ESC 30 directs actuation of outputs which can include a signal to the RIM to turn on the pump, for example by engaging a clutch, which signal will indicate the appropriate RIM address and port address, and may extend to a request to the engine to increase idle speed. The pump may be turned off if inputs indicate the pump is engaged but not loaded.

An excellent example of how RIM functionality depends directly on ESC 30 operation is provided by the way in which oscillating output signals are generated from RIM 40. This is done by the ESC 30 issuing alternating on and off signals at the appropriate frequency to reproduce an oscillating output. All output states, and sequences of output states of a RIM 40, are under the control of the ESC 30, which determines these states by execution of the load management program with reference to RIM database 96. The mapping of outputs to the appropriate port(s) is also supplied by database 96. While the digital controller 71 of a RIM is programmed and capable of reproducing a number of types of functionality, invocation of specific functions lies entirely with ESC 30.

Figure 4:
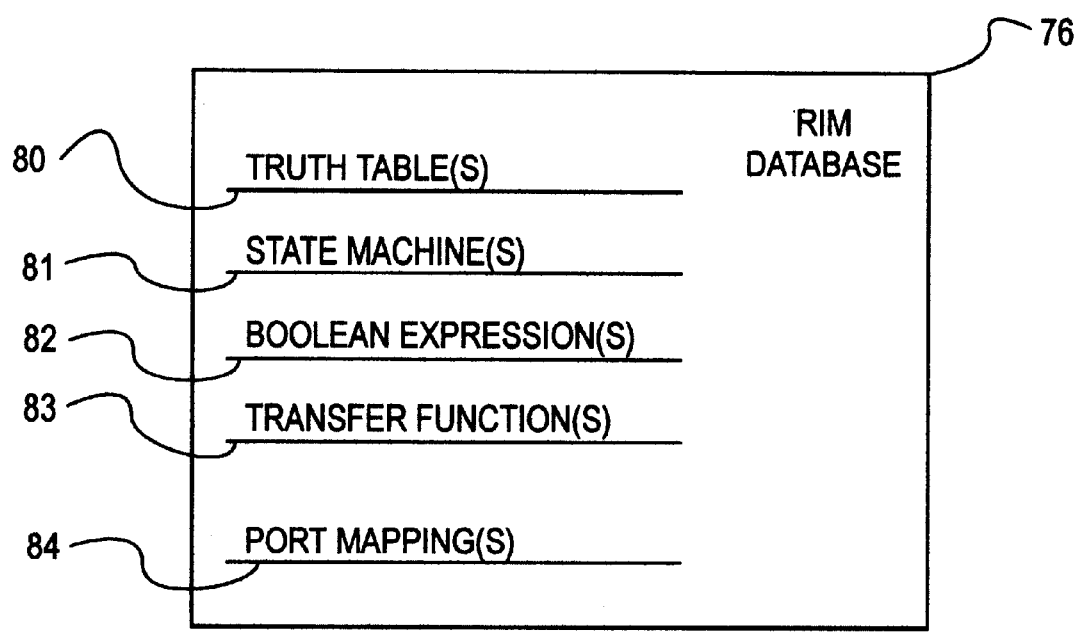
FIG. 4 is an illustration of a database providing the functional specification for a remote interface module connected to the vehicle electrical system.

The load management program 95 executes is tasks, in so far as relate to RIMs, by reference to a RIM database 96 as illustrated in FIG. 4. RIM functions may be expressed in a number of different ways, such as truth tables 80, state machines 81, boolean expressions 82 and transfer functions 83. Each such element will include a port mapping 84. The port mappings 84 define both entry points to truth tables, boolean expressions and the like for inputs received from a RIM as well as output values.

While the invention is shown in only one of its forms, it is not thus limited but is susceptible to various changes and modifications without departing from the spirit and scope of the invention.

What is claimed is:

1. A vehicle control system comprising:
   a communication network;
   a controllable component installed on the vehicle;
   a remote interface module connected to the communication network for two way communication, the remote interface module having a processor which is programmable for emulating circuit functionality including control and signal processing components and a plurality of device ports for inputs and outputs, and a communication port, the remote interface module being responsive to programming received on the communication port for assuming functionality specified by the programming for providing control of the controllable component;
   a system controller connected to the communication network for two way communication, having a memory including a data structure specifying the functionality to be emulated by the remote interface module and signal processing means for providing programming to the remote interface module based on the data structure.

2. A vehicle control system as claimed in claim 1, wherein the data structure maps signals to and from the remote interface module with particular sets of device ports.

3. A vehicle control system as claimed in claim 2, further comprising:
   a diagnostic port to the communication network allowing connection of the vehicle control system to an external source of data structures.

4. A control system for a vehicle having a plurality of differentiated devices connected thereto, the control system comprising:
   a serial data link;
   a remote interface module having a communication port connected to the serial data link and a plurality of device ports connected to selected ones of the differentiated devices, the remote interface module being responsive to signals received on the communication port over the serial data link for assuming a functionality specified by the signals to produce particular states characterized by predetermined signal levels on the plurality of device ports;
   a vehicle component connected to a device port for control through the predetermined signal levels on the device ports; and
   an electronic system controller coupled to the serial data link for multiplexing signals on the serial data link, and comprising memory and microcomputer means for storing data structures defining functionality for the remote interface module and for generating signals for transmission over the serial data link to the remote interface module to apply the functionality and to produce the particular states.

5. A control system as claimed in claim 4, further comprising:
   program means executing on the electronic system controller for updating the particular state of the remote interface module periodically whereby the remote interface module assumes successive states.

6. A control system as claimed in claim 5, and further comprising:
   a plurality of specialized remote controllers connected to the serial data link responsive to signals received over the serial data link and to local conditions for assuming the particular states; and
   the data structures further including signal specifications for transmission to a specialized remote controller.

7. A control system for a vehicle, comprising:
   a serial communication link;
   a first specialized remote controller connected to the serial communication link and responsive to selected signals received over the link and to locally sensed conditions for internally generating output states for any devices connected to the specialized remote controller;
   a non-specialized remote interface module connected to the serial communication link and responsive to selected signals received over the link for assuming selected output states;
   a vehicle component connected to the non-specialized remote interface module for control; and
   a central system controller connected to the serial communication link for multiplexing signals on the serial communication link, the central system controller comprising data storage for data structures defining the selected output states of the non-specialized remote interface module and defining signal specifications for the first specialized remote controller, and processing means for developing input signals for the remote interface module and the specialized remote controller.

8. A control system as claimed in claim 7, wherein the central system controller further comprises:
   processing means executing a load management operation in an endless loop, the load management program including a module responsive to the data structures defining permissible output states for the non-specialized remote interface module for realizing at least one of the following functions, a state machine, a transfer function, a boolean expression, or a truth table.

9. A control system as claimed in claim 8, further comprising a signaling process wherein the processing means for developing input signals refers to the data structures to obtain mappings to the ports of the remote interface module and to the signaling process to obtain variable inputs for the load management program.

10. A method of applying vocations to a vehicle wherein the vehicle includes an electronic system controller having a memory, a communication link extending from the electronic system controller and an access port into the communication link and devices requiring control, the method comprising the steps of:

installing a non-specialized remote interface module on the vehicle, the remote interface module including a plurality of input and output ports for connection to devices installed on the vehicle to be controlled by the non-specialized remote interface module, the remote interface module being responsive to specific input triggering signals for assuming a specific state where states are characterized by the generation of certain signals on the output ports;

providing a data structure of possible states for the remote interface module on an external computer;

attaching the external computer to a vehicle via the access port and identifying the vehicle; and responsive to the identification of the vehicle, writing a data structure mapping of the states for the remote interface module to the memory of the electronic system controller over the access port from the external computer.

11. A vehicle comprising:

a controllable component;

an interface module coupled to the controllable component which may assume a function and a plurality of controller states for regulating actuation and energization of the controllable component;

a communication link; and a system controller including memory for storing a data structure delineating permissible controller states and functions for the interface module for the actuation of the controllable component; and the interface module being connected to the system controller over the communication link for assuming selected controller states as directed by the system controller through signals applied from the system controller to the interface module over the communication link.

12. A control system for a plurality of accessories installed on a motor vehicle, the control system comprising:

a plurality of device ports connected to the plurality of accessories;

a signal converter and director connected to the device ports for executing a process responsive to triggering signals which applies predetermined sequences of signals to a first selected set of device ports and to transmit data from a second selected set of device ports;

a serial data link for applying triggering signals to the signal converter and director and carrying data transmitted by the signal converter and director; and a programmable system controller connected to the serial data link for multiplexing signals and data on the serial data link and for executing a programmed process responsive to the data generating and transmitting triggering signals to the signal converter and director.

13. A control system as claimed in claim 12, further comprising memory addressable by the programmable system controller storing data structures specifying output conditions for the signal converter and director.

* * * * *